United States Patent
Owechko

(10) Patent No.: US 9,336,480 B1
(45) Date of Patent: May 10, 2016

(54) SELF-AWARE SWARMS FOR OPTIMIZATION APPLICATIONS

(75) Inventor: Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 720 days.

(21) Appl. No.: 13/155,335

(22) Filed: Jun. 7, 2011

Related U.S. Application Data

(63) Continuation-in-part of application No. 11/800,264, filed on May 3, 2007, now Pat. No. 8,589,615, which is a continuation-in-part of application No. 10/918,336, filed on Aug. 14, 2004, now Pat. No. 7,636,700.

(51) Int. Cl.
   *G06F 15/00* (2006.01)
   *G06F 15/18* (2006.01)
   *G06N 3/00* (2006.01)

(52) U.S. Cl.
   CPC ...................................... *G06N 3/006* (2013.01)

(58) Field of Classification Search
   CPC ....... G06N 3/004; G06N 3/006; G06N 5/003; G06K 9/6229
   USPC .......................................................... 706/62
   See application file for complete search history.

(56) References Cited

U.S. PATENT DOCUMENTS

| | | | |
|---|---|---|---|
| 7,558,762 | B2 | 7/2009 | Owechko et al. |
| 7,672,911 | B2 | 3/2010 | Owechko et al. |

OTHER PUBLICATIONS

Eberhart Russel and Yuhui Shi "Particle Swarm Optimization: Developments, Applications and Resources" IEEE 2001 [Online] Downloaded Feb. 6, 2014 http://ieeexplore.ieee.org/stamp/stamp.jsp?tp=&arnumber=934374.*
Kitayama et al "Adaptive Range Particle Swarm Optimization" Optim Eng 2009 [Online] Downloaded Feb. 6, 2014 http://download.springer.com/static/pdf/903/art%253A10.1007%252Fs11081-009-9081-7.pdf?auth66=1391898391_8f4fc670b3f23773b22b09ae1127556d&ext=.pdf.*
G. Shakhanarovich, et al. "Integrated face and gait recognition from multiple views," In Proceedings of the IEEE Conference on Computer Vision and Pattern Recognition, Dec. 2001, Kauai, Hawaii.
Office Action from U.S. Appl. No. 10/918,336.
Notice of Allowability for U.S. Appl. No. 11/433,159.
Reply to Notice of Allowance for U.S. Appl. No. 11/433,159.
Notice of Allowability for U.S. Appl. No. 10/918,336.
Notice of Allowability for U.S. Appl. No. 11/800,265.
Notice of Allowability for U.S. Appl. No. 11/367,755.

(Continued)

*Primary Examiner* — Ben Rifkin
(74) *Attorney, Agent, or Firm* — Tope-McKay & Associates

(57) ABSTRACT

Described is a high-dimensional optimization system implementing a modification of particle swarm optimization called self-aware particle swarm optimization. A plurality of software agents is configured to operate as a cooperative swarm to locate an objective function optima in a multi-dimensional solution space. The plurality of software agents is influenced by a set of parameters which influence exploration of the multi-dimensional solution space and convergence on the objective function optima. The plurality of software agents automatically modifies the set of parameters in response to at least one measure of convergence progress. Self-aware particle swarm optimization allows for monitoring of simple convergence properties to provide feedback to the swarm dynamics and make the swarm self-aware and adjust itself to the problem being solved.

6 Claims, 8 Drawing Sheets

(56) References Cited

OTHER PUBLICATIONS

Notice of Allowability for U.S. Appl. No. 11/385,983.
Barbara Zitova and Jan Flusser, "Image registration methods: a survey," Image and Vision Computing 21, pp. 977-1000, 2003.
Kennedy, J., Eberhart, R. C., and Shi, Y., Swarm Intelligence San Francisco: Morgan Kaufman Publishers, 2001, Chapter 7 ("The Particle Swarm"), pp. 287-318.
S. Medasani and R. Krishnapuram, "Graph Matching by Relaxation of fuzzy assignments," IEEE Transactions on Fuzzy Systems, 9(1), 173-183, Feb. 2001.
K. Sato and J.K. Aggarwal, "Temporal spatio-velocity transform and its application to tracking and interaction," CVIU 96 (2004), 100-128.
S. Hongeng, R. Nevatia, and F. Bremond, "Video-based event recognition: activity representation and probabilistic recognition methods," CVIU 96(2004), 129-162.
Medioni, I. Cohen, F. Bremond, S. Hongeng, R. Nevatia, "Event detection and analysis from video streams," IEEE PAMI 23(8), 2001, 873-889.
N. Oliver, A. Garg, and E. Horvitz, "Layered representations for learning and inferring office activity from multiple sensory channels," CVIU 96(2004), 163-180.
A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.
M.P. Windham, "Numerical classifiction of proximity data with assignment measure," Journal of Classification, vo. 2, pp. 157-172, 1985.
S. Gold and A. Rangarajan, "A graduated assignment algorithm for graph matching," IEEE Transaction on Pattern Analysis and Machine Intelligence, vol. 18, pp. 377-387, Apr. 1996.
Z. Zhang, "A flexible new technique for camera calibration," IEEE Transactions on Pattern Analysis and Machine Intelligence, 22(11): 1330-1334, 2000.
Giorgio Carpaneto, Paolo Toth, "Algorithm 548: Solution for the assignment problem [H]," ACM Transactions on Mathematical Software, 6(1): 104-111, 1980.
I. Hartley, A. Zisserman, "Multiple view geometry in computer vision," Cambridge University Press, Cambridge, UK 2000.
Longuet-Higgins, "A computer algorithm for reconstructing a scene from two projections" Nature, 293: 133-135, Sep. 1981.
D.L. Swets, et al., "Genetics Algorithms for Object Recognition in a complex scene," Proc. of Intl. Conference on Image Processing, vol. 2, Oct, pp. 23-26, 1995.
V. Ciesielski and M. Zhang, "Using Genetic Algorithms to Improve the Accuracy of Object Detection," In Proceedings of the third Pacific-Asia Knowlege Discovery and Data Mining Conference, Ning Zhong, and Lizhu Zhou (Eds.), Knowledge Discovery and Data Mining—Research and Practical Experiences. Tsinghua University Press, p. 19-24. Beijing, China, Apr. 26-31, 1999.
D. Beasley, D. R. Bull, and R. R. Martin, "A Sequential Niching Technique for Multimodal Function Optimization," Evolutionary Computation, 1(2): p. 101-125, 1993.
R. Krishnapuram and J. M. Keller, "Quantative Analysis of Properties and Spatial Relations of Fuzzy Image Regions," Transactions on Fuzzy Systems, 1(2):98-110, 1993.
Y. Owechko, et al., "Vision-Based Fusion System for Smart Airbag Applications," Intelligent Vehicle Symposium, 2002 IEEE, Publication Date: Jun. 17-21, 2002. vol. 1, on pp. 215-250 vol. 1.
B. J. Scholl, "Objects and Attention: The State of the Art," Cognition 80: 1-46, 2001.
Liao, Wenhul and Ji, Qiang 2006, "Efficient Active Fusion for Decision-making via VOI Approximation," in Proc. AAAI 2006, 1180-1185.
Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.
Bradski, G. and S. Grossberg (1995), "Fast learning VIEWNET architectures for recognizing 3-D objects from multiple 2-D views," Neural Networks 8, 1053-1080.
Charniak, E. (1991), "Bayesian networks without tears," AI Magazine 12, 50-63.
Hu, W., D. Xie, et al. (2004), "Learning activity patterns using fuzzy self-organizing neural network," IEEE Transactions on Systems, Man, and Cybernetics—Part B: Cybernetics 34, 1618-1626.
Lazebnik, S., C. Schmid, et al., "Beyond bags of features: Spatial pyrarmid matching for recognizing natural scene categories," 2006 IEEE Computer Society Conference on Computer Vision and Pattern Recognition (vol. 2), New York, NY, pp. 2169-2178.
Lowe, D., "Object recognition from local scale-invariant features," The Proceedings of the Seventh IEEE International Conference on Computer Vision, (vol. 2 ) 1999, pp. 1150-1157 vol. 2, Corfu, Greece.
Medasani, S. and Y. Owechko (2007), "Behavior recognition using cognitive swarms and fuzzy graphs," SPIE Defense and Security Symposium, Orlando, FL, Proc. SPIE 6560, Intelligent Computing: Theory and Applications V, 656005 (Apr. 30, 2007), pp. 1-9.
Park, S. and J. Aggarwal, "A hierarchical Bayesian network for event recognition of human actions and interactions," ACM SIGMM International Workshop on Video Surveillance, pp. 164-179 (2004). Berkely, CA.
B. Bhanu, et al., "Adaptive Image Segmentation Using a Genetic Algorithm," IEEE Transactions on Systems, Man, and Cybernetics, vol. 25, No. 12, Dec. 1995, pp. 1543-1567.
Khosla, D., Moore, C., and Chelian, S., "A Bioinspired system for spatio-temporal recognition in static and video imagery," Proceedings of SPIE, 6560: Intelligent Computing: Theory and Applications V, 655002, 2007, 8 pages.
Judea Pearl (2000), "Bayesian Networks," Handbook of Brain Theory and Neural Networks, Technical Report, R-277, Nov. 2000.
Avrim Blum (1996), "On-Line Algorithms in Machine Learning", In Proceedings of the Workshop on On-Line Algorithms, Dagstuhl.
R. C. Eberhart and Y. Shi, "Particle Swarm Optimization: Developments, Applications, and Resources," IEEE Proceedings of the 2001 Congress on Evolutionary Computation, (CEC 2001), Seoul, Korea, 2001, pp. 81-86, vol. 1.
Frans van den Bergh, et al., "A Cooperative Approach to Panicle Swarm Optimization," Special issue of IEEE Transactions on Evolutionary Computation, vol. 8, Issue: 3, Jun. 2004, pp. 225-239.
S. Medasani and Y. Owechko, "Possibilistic Particle Swarms for Optimization," Proceedings 5673 of SPIE/IST Symposium on Electionic Imaging, San Jose, 2005.
Y. Owechko, S. Medasani, and N. Srinivasa, "Classifier Swarms for Human Detection in Infrared Imagery," IEEE Conference on Computer Vision and Pattern Recognition Workshop, 2004, CVPRW '04, Washington, D.C., pp. 121-127.
Y. Owechko and S. Medasani, "A Swarm-Based Volition/Attention Framework for Object Recognition," IEEE Computer Society Conference on Computer Vision and Pattern Recognition—Workshops, 2005, CVPR Workshops, San Diego, 2005, p. 91.
Y. Owechko and S. Medasani, "Cognitive Swarms for Rapid Detection of Objects and Associations in Visual Imagery," IEEE Swarm Intelligence Symposium, SIS 2005, Proceedings, Pasadena, 2005, pp. 420-423.
P. Saisan, S. Medasani, and Y. Owechko, "Multi-View Classifier Swarms for Pedestrian Detection and Tracking," IEEE Computer Society Conference on Computer Vision and Pattern Recognition— Workshops, 2005, CVPR Workshops, San Diego, 2005, p. 18.
R. Hassan, B. Cohanim, and O. de Week, "A Comparison of Particle Swarm Optimization and the Genetic Algorithm," American Institute of Aeronautics and Astronautics Conference, In 46th AIAA/ASME/ASCE/AHS/ASC Structures, Structural Dynamics, and Materials Conference, 2005, pp. 1138-1150.
J. F. Schutte, J. A. Reinbolt, B. J. Fregly, R. T. Haftka, and A. D. George, "Parallel Global Optimization with the Particle Swarm Algorithm," Int. J. Numerical Methods in Engineering; Dec. 7, 2004; 61(13): pp. 2296-2315.
J. Kennedy and W. M. Spears, "Matching Algorithms to Problems: An Experimental Test of the Particle Swarm and Some Genetic Algorithms on the Multimodal Problem Generator," Proceedings of

(56) References Cited

OTHER PUBLICATIONS

IEEE International Conference on Evolutionary Computation, World Congress on Computational Intelligence, pp. 78-83, 1998.

D. Nister and H. Stewenius, "Scalable recognition with a vocabulary tree," CVPR '06 Proceedings of the 2006 IEEE Computer Society Conference on Computer Vision and Pattern Recognition—vol. 2, pp. 2161-2166.

R. Krishnapuram, S. Medasani, S. Jung and Y. Choi, "Content Based Image Retrieval Based on a Fuzzy Approach," IEEE Transactions on Knowledge and Data Engineering (TKDE), Oct. 2004, (vol. 16, Issue: 10), pp. 1041-4347.

N. Oliver and A. Pentland, "Graphical models for driver behavior recognition in a smart car," Proceedings of the IEEE Intelligent Vehicles Symposium, 2000, IV 2000, pp. 7-12.

R.T. Collins, A. J. Lipton, and T. Kanade, "Introduction to the special section on video survelliance," IEEE Transactions on Pattern Analysis and Machine Intelligence, vol. 22, Issue: 8, IEEE-PAMI, 22(8), Aug. 2000, pp. 745-746.

N. Oliver, B. Rosario, and A. Pentland, "A Bayesian computer vision system for modeling human interactions," IEEE Transactions on Pattern Analysis and Machine Intelligence, vol. 22, Issue: 8, IEEE-PAMI, Aug. 2000, pp. 831-843.

Jean-Yves Bouguet, "Camera Calibration Toolbox for Matlab," http://www.vision.caltech.edu/bouguetj/calib...doc/ Mar. 2007, pp. 1-5.

Intel OpenCV Computer Vision Library (C++), http://www.intel.com/research/mrl/opencv/ Mar. 2007, pp. 1-2.

Payam Saisan; Swarup Medasani; Narayan Srinivasa and Yuri Owechko, "Modeling of pedestrian motion for recognition", Proc. SPIE 5685, Image and Video Communications and Processing 2005, 92 (Apr. 6, 2005); doi:10.1117/12.588344P, IS&T/SPIE 17th annual symposium, San Jose, CA 2005.

A.R. Dick, et al., "Combining Single view recognition and multiple view stereo for architectural scenes," Eighth IEEE International Conference on Computer Vision (ICCV'01) vol. 1, Jul. 7-14, 2001, Vancouver, B.C., Canada, pp. 268-274.

G. Shakhanarovich, et al., "Integrated face and gait recognition from multiple views," In Proceedings of the IEEE Computer Vision and Pattern Recognition, Dec. 2001, Kauai, Hawaii, CVPR 2001, pp. I-439-I-446, vol. 1.

Sujit Kuthirummal, et at., "Planar shape recognSion across multiple views," In Proceedings of the International Conference on Pattern Recognition (ICPR)—2002, Quebec, Canada, 16th International Conference, vol. 1, pp. 456-459.

Sujit Kuthirummal, et al., "Multiview constraints tor recognition of planar curves in fourier domain," Conference: ICVGIP 2002, Proceedings of the Third Indian Conference on Computer Vision, Graphics & Image Processing, Ahmadabad, India, Dec. 16-18, 2002.

A. Selinger and R.C. Nelson, "Appearance-based object recognition using multiple views," In Proceedings of the 2001 IEEE Computer Society Conference on Computer Vision and Pattern Recognition—Dec. 2001, Kauai, Hawaii, CVPR 2001, vol. 1, pp. I-905-I-911.

R. Brits, et al., "A Niching Particle Swarm Optimizer," In Proceedings of the Conference on Simulated Evolution And Learning, 2002.

F. Rojas, I. Rojas, R. M. Clemente, and C.G. Puntoner, "Nonlinear blind source separation using genetic algorithms," In Prooceedings of International Conference on Independent Component Analysis, 2001, pp. 400-405.

N. Srinivasa, et al., "Fuzzy edge-symmetry features for enhanced intruder detection," The 12th IEEE International Conference on Fuzzy Systems, 2003, FUZZ '03, vol. 2.

F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005, IEEE Computer Society Conference on Computer Vision and Pattern Recognition—Workshops, 2005, CVPR Workshops, p. 89.

Y. Sun and R Fisher, "Hierarchial Object-Based Visual Attention," Biologically Motivated Computer Vision Lecture Notes in Computer Science vol. 2525, 2002, pp. 427-438.

A. Huertas, and R. Nevatia, "Detecting changes in Aerial Views of Man-Made Structures," Image and Vision Computing, vol. 18, Issue 8, May 15, 2000, pp. 583-596.

R. Mendes. "The Fully Informed Particle Swarm: Simpler, Maybe Better," Special issue of IEEE Transactions on Evolutionary Computation on Particle Swarm Optimization, vol. 8, No. 3, Jun. 2004, pp. 204-210.

K.E. Parsopoulos, et al., "On the Computation of All Global Minimizers Through Particle Swarm Optimization," Special issue of IEEE Transactions on Evolutionary Computation on Particle Swarm Optimization, vol. 8, No. 3, Jun. 2004, pp. 211-224.

A. Ratnaweera, "Self-Organizing hierarchical particle Swarm Optimizer with Time-Varying Acceleration Coefficients," Special issue of IEEE Transactions on (vol. 8, Issue: 3) Trans. On Evolutionary Computation on Particle Swarm Optimization, vol. 8, No. 3, Jun. 2004, pp. 240-255.

C.A. Coello, "Handling Multiple Oblectives With Particle Swarm Optimization," Special issue of IEEE Transactions on Evolutionary Computation on Particle Swarm Optimization, vol. 8, No. 3, Jun. 2004, 256-279.

L. Messerschmidt, et al., "Learning to Play Games Using a PSO-Based Competitive Learning Approach," Special issue of IEEE Trans. On Evolutionary Computation on Particle Swarm Optimization, vol. 8, No. 3, Jun. 2004, pp. 280-288.

M.P. Wachwiak, et al., "An Approach to Multimodal Biomedical Image Registration Utilizing Particle Swarm Optimization," Special issue of IEEE Trans. On Evolutionary Computation on Particle Swarm Optimization: vol. 8, No. 3, Jun. 2004, pp. 289-301.

J.C. Bezdek, "Pattern Recognition with Fuzzy Objective Functions Algorithms," Plenum Press, New York, 1981, Ch. 3, pp. 43-93, "Objective Function Clustering".

T. Kailath: et al., "Linear Esimation," Prentice Hall, NJ, 2000, Ch. 3, pp. 78-103, "Stochastic Least-Squares Probiems".

\* cited by examiner

SELF-AWARE SWARMS FOR OPTIMIZATION APPLICATIONS

PRIORITY CLAIM

This patent application is a Continuation-in-Part application of U.S. Non-Provisional application Ser. No. 11/800,264, filed on May 3, 2007, entitled, "Behavior Recognition Using Cognitive Swarms and Fuzzy Graphs", which is a Continuation-in-Part application of U.S. Non-Provisional application Ser. No. 10/918,336, filed on Aug. 14, 2004, entitled, "Object Recognition System Incorporating Swarming Domain Classifiers", now issued as U.S. Pat. No. 7,636,700.

BACKGROUND OF THE INVENTION (1) Field of Invention

The present invention relates to a system for high-dimensional optimization and, more particularly, to a system for high-dimensional optimization utilizing self-aware particle swarm optimization.

(2) Description of Related Art

The present invention is related to a high-dimensional optimization system for applications such as network optimization, computer vision, and smart antennas, using a modification of particle swarm optimization. Current prior art consists of evolutionary heuristic optimization algorithms, such as genetic algorithms and particle swarm optimization (PSO).

PSO is a simple but powerful population-based algorithm that is effective for optimization of a wide range of functions as described by Kennedy et al. in "Swarm Intelligence", San Francisco: Morgan Kaufmann Publishers, 2001, and by Eberhart and Shi in "Particle Swarm Optimization: Developments, Applications, and Resources," in Proceedings of Institute of Electrical and Electronics Engineers (IEEE) Congress on Evolutionary Computation (CEC 2001), Korea, 2001, which are hereby incorporated by reference as though fully set forth herein.

PSO models the exploration of multi-dimensional solution space by a "swarm" of agents where the success of each agent has an influence on the dynamics of other members of the swarm. PSO has its roots in theories of social interaction. Each "particle" in the swarm resides in a multi-dimensional solution space. The positions of the particles represent candidate problem solutions. Additionally, each particle has a velocity vector that allows it to explore the space in search of an objective function optima. Each particle i keeps track of a position vector $\vec{y}_i$ that represents the current best solution the particle has found. Another position vector $\vec{y}_g$ is used to store the current global best solution found by all of the particles. The velocity and position vectors for particle i are then changed probabilistically according to the following set of dynamic update equations:

$$\vec{v}_i(t+1) = w\vec{v}_i(t) + c_1 q_2 [\vec{y}_i(t) - \vec{x}_i(t)] + c_2 q_2 [\vec{y}_g(t) - \vec{x}_i(t)]$$
$$\vec{x}_i(t+1) = \vec{x}_i(t) + x\vec{v}_i(t+1)$$

where $\vec{x}_i(t)$ and $\vec{v}_i(t)$ are the position and velocity vectors at time t of the i-th particle and $c_1$ and $c_2$ are parameters that weight the influence of the "individual best" and "swarm best" terms. w is a momentum constant that prevents premature convergence, and x is a constriction factor which also influences the convergence of PSO. $q_1$ and $q_2$ are random variables that allow the particles to better explore the solution space. The described dynamics cause the swarm to concentrate on promising regions of solution space very quickly with very sparse sampling of the solution space. FIG. 1 illustrates a model of PSO depicting a multi-dimensional parameter solution space 100 through which particles, for example particle $P_i$ 102, travel in search of the objective function optima. As described previously, the positions of the particles represent vectors of multi-node parameter values in the solution space 100. In addition, each of the particles, including $P_i$ 102, has a velocity vector 104 that allows it to explore the multi-dimensional parameter solution space 100.

Although PSO is a relatively new area of research, extensive literature exists that documents its efficiency and robustness as an optimization tool for high dimensional spaces as described in the Special issue of IEEE Trans. on Evol. Computation on Particle Swarm Optimization, Vol. 9, No. 3, June, 2004 and by Hassan et al. in "A Comparison of Particle Swarm Optimization and the Genetic Algorithm," American Institute of Aeronautics and Astronautics (AIAA) Conference, 2005, which are hereby incorporated by reference as though fully set forth herein.

Both theoretical analysis and practical experience show that PSO converges on good solutions for a wide range of parameter values. The evolution of good solutions is stable in PSO because of the way solutions are represented (e.g. small changes in the representation result in small changes in the solution). Simulations have shown that the number of particles and iterations required are relatively low and scale slowly with the dimensionality of the solution space.

While the above methods are effective, the present invention provides an alternative to the prior art by providing faster convergence and the ability to handle higher dimensional problems with the same computational resources by adapting algorithm parameters automatically to the problem through self-monitoring.

SUMMARY OF THE INVENTION

The present invention relates to a high-dimensional optimization system which implements a modification of PSO called self-aware particle swarm optimization (SAPSO).

The high dimensional optimization system comprises one or more processors configured to perform operations of causing a plurality of software agents to operate as a cooperative swarm to locate and converge at an objective function optima in a multi-dimensional solution space. Each software agent is assigned an initial velocity vector to explore the multi-dimensional solution space, and each software agent is configured to perform at least one iteration, the iteration being a search in the multi-dimensional solution space for a potential objective function optima. Additionally, each software agent keeps track of a first position vector representing a current best solution that the software agent has identified, and a second position vector used to store a current global best solution among all software agents. Each of the initial velocity, first position, and second position vectors changing probabilistically. Furthermore, the plurality of software agents is influenced by a set of parameters which influence exploration of the multi-dimensional solution space and convergence on the objective function optima. The plurality of software agents automatically modifies the set of parameters in response to at least one measure of convergence progress.

In another aspect, the plurality of software agents is configured to automatically modify the set of parameters to explore a new region of the solution space if convergence is not reached on a good solution.

In another aspect, the at least one measure of convergence progress is selected from a group consisting of a standard deviation of the cooperative swarm positions, a rate of change of the current best solution, and a recent stability of the current best solution.

In another aspect, the at least one measure of convergence progress is a standard deviation of the cooperative swarm positions, and wherein the standard deviation of the cooperative swarm positions at each iteration is used to select at least one of the set of parameters.

In another aspect, the standard deviation of the swarm positions at each iteration is equivalent to a measure of the swarm diameter.

In another aspect, if the swarm diameter becomes less than a predetermined threshold value, at least one of the set of parameters is increased to a large value to force the cooperative swarm to explore a new region of the solution space, wherein at least one of the set of parameters is then reduced to allow the cooperative swarm to converge on a better solution in the new region of the solution space.

Finally, as can be appreciated by one skilled in the art, the present invention also comprises a computer program product and a computer-implemented method. The computer program product comprises computer-readable instruction means stored on a non-transitory computer-readable medium that are executable by a computer for causing the computer to perform the operations described herein. Additionally, the method comprises acts of causing a data processor to perform a plurality of operations. The acts comprise the operations of the optimization system according to the present invention.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
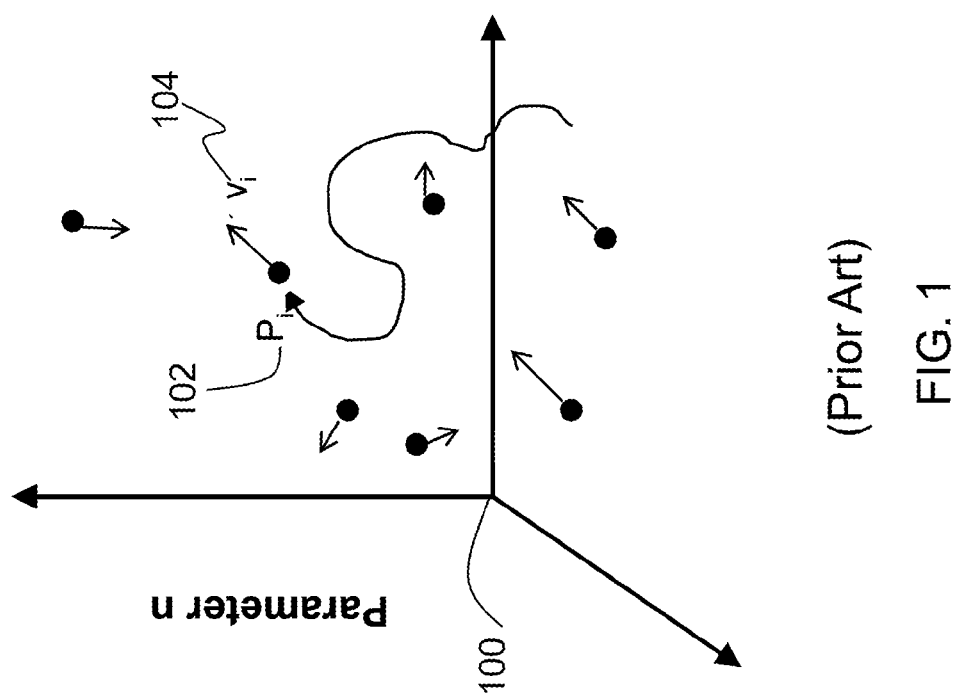
FIG. 1 is an illustration modeling particle swarm optimization.

The present invention relates to a system for high-dimensional optimization and, more particularly, to a system for high-dimensional optimization utilizing self-aware particle swarm optimization. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a high-dimensional optimization system utilizing self-aware particle swarm optimization. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a non-transitory computer-readable medium such as a floppy disk, a CD-ROM, and a flash drive. These aspects will be described in more detail below.

(2) Specific Details

The present invention describes a modification of particle swarm optimization called self-aware particle swarm optimization (SAPSO). Applications of SAPSO include network optimization, computer vision, and smart antennas, for instance. SAPSO allows the PSO optimization algorithm to monitor its progress and adjust its parameters automatically to achieve better convergence. SAPSO adjusts its parameters periodically to balance exploration of the solution space with accurate convergence on good solutions.

The advantages of SAPSO for optimization problems include faster and more stable convergence properties, allowing higher dimensional optimization problems to be solved with the same computational resources. Additionally, another advantage is greatly reduced sensitivity to parameter settings. Finally, the present invention provides better balancing of exploration of the solution space with fast convergence on good solutions. The present invention is applicable to a wide range of high-dimensional optimization problems including, but not limited to, mobile ad hoc wireless networks, sensor networks, smart antennas, computer vision, smart materials, resource allocation, factory scheduling, and fast search.

The high-dimensional optimization system described herein causes a plurality of software agents to operate as a cooperative swarm to locate and converge at an objective function optima in a multi-dimensional solution space, wherein each software agent is assigned an initial velocity vector to explore the multi-dimensional solution space. Each software agent is configured to perform at least one iteration, the iteration being a search in the multi-dimensional solution space for a potential objective function optima where each software agent keeps track of a first position vector representing a current best solution that the software agent has identified, and a second position vector used to store a current global best solution among all software agents, with each of the initial velocity, first position, and second position vectors changing probabilistically.

Additionally, SAPSO allows the PSO swarm to be aware of its progress in solving the problem and to modify its own parameter settings automatically in response to the difficulty of the problem. If convergence is not being reached on a good solution, the swarm automatically modifies its dynamics to explore new regions of the solution space. SAPSO allows higher dimensional or more difficult optimization problems to be solved using the same computational resources compared to PSO. In general, a number of measures of convergence progress can be used by SAPSO to set its parameters, non-limiting examples of which include standard deviation of swarm positions, rate of change of the best solution found so far, and the recent stability of the best current solution.

A simple example is to use the standard deviation of the swarm positions at each iteration (i.e., a measure of the swarm's diameter) to select the PSO x value. Typically, the swarm parameters have always been set by the operator and remained constant. A small value of x results in stable convergence towards a solution, while values of x greater than 1 result in instability of the swarm and exploration of new regions of the solution space. Thus, one strategy to avoid convergence on sub-optimal solutions is to periodically explore new regions when the swarm diameter is small. This can be done using the following rule:

If (std_Swarm(iter)<std_val & iter_frame==max_iter_per_frame)
$X=X_2$
Elseif (std_Swarm(iter)>=std_val & iter_frame==max_iter_per_frame)
$X=X_1$
End, where std_Swarm(iter) is the standard deviation of the swarm positions for the current swarm iteration, std_val is a threshold value, and max_iter_per_frame is the number of iterations per frame. A frame is the minimum number of iterations for which the swarm parameters are held constant. The variable iter_frame maintains a count of how many iterations have occurred since the last change in X. $X_2$ is greater than 1 and $X_1$ is less than 1. The above rule states that if the swarm diameter becomes less than a certain threshold value for a frame, x is increased to a larger value to force the swarm to expand for at least one frame to explore new regions. X is then reduced to allow the swarm to converge on a better solution in the new region.

As described above, in the PSO update equation $\vec{x}_i(t+1) = \vec{x}_i(t) + X\vec{v}_i(t+1)$. X represents a constriction factor which influences convergence of the swarm. A small x results in stable convergence toward a solution, while a X greater than 1 results in instability of the swarm and exploration of new regions of the solution space. By using the rule above, X is modified in the update equation to influence convergence in response to a measure of convergence progress, which is the standard deviation of the swarm positions in the given example.

Figure 2:
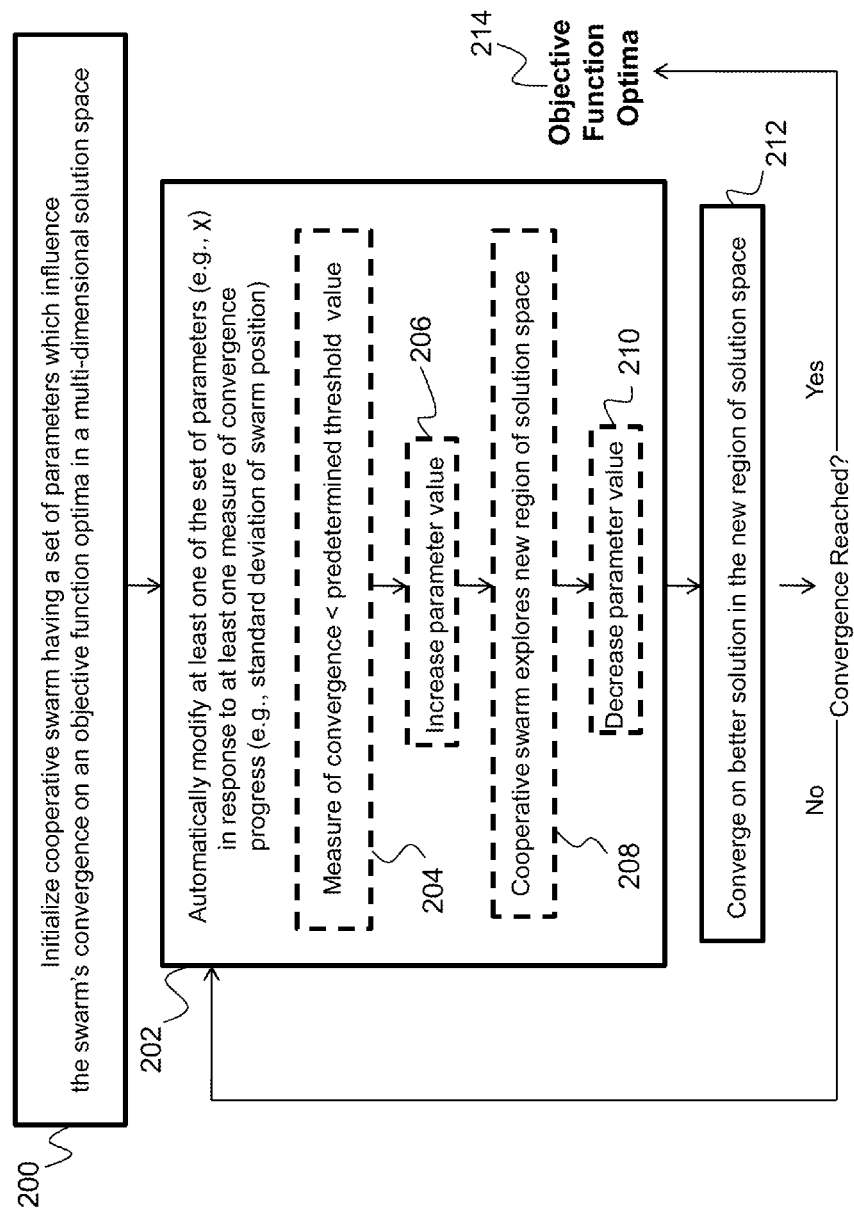
FIG. 2 is a flow diagram depicting a method of high-dimensional optimization according to the present invention.

FIG. 2 is a flow diagram depicting the method of high-dimensional optimization presented above. In a first step 200, the cooperative swarm is initialized. As described above, each particle (or software agent) in the swarm has a set of parameters which influence the swarm's convergence on an objective function optima in a multi-dimensional solution space. In a second step 202 of SAPSO, the swarm automatically modifies at least one of the set of parameters in response to at least one measure of convergence progress. As shown in FIG. 2, in order to automatically modify a parameter in response to a measure of convergence progress in the second step 202, the measure of convergence (e.g., standard deviation of swarm position) is compared to a predetermined threshold value. If the measure of convergence is less than the predetermined threshold value 204, then the parameter value is increased 206. The cooperative swarm then explores a new region of the solution space 208. The parameter value is then decreased 210, allowing convergence on a better solution in the new region of the solution space 212. If convergence is not reached, the process returns to the second step 202 of the process to modify the parameter (or parameters). If convergence is reached, the cooperative swarm has located the objective function optima 214.

Figure 3:
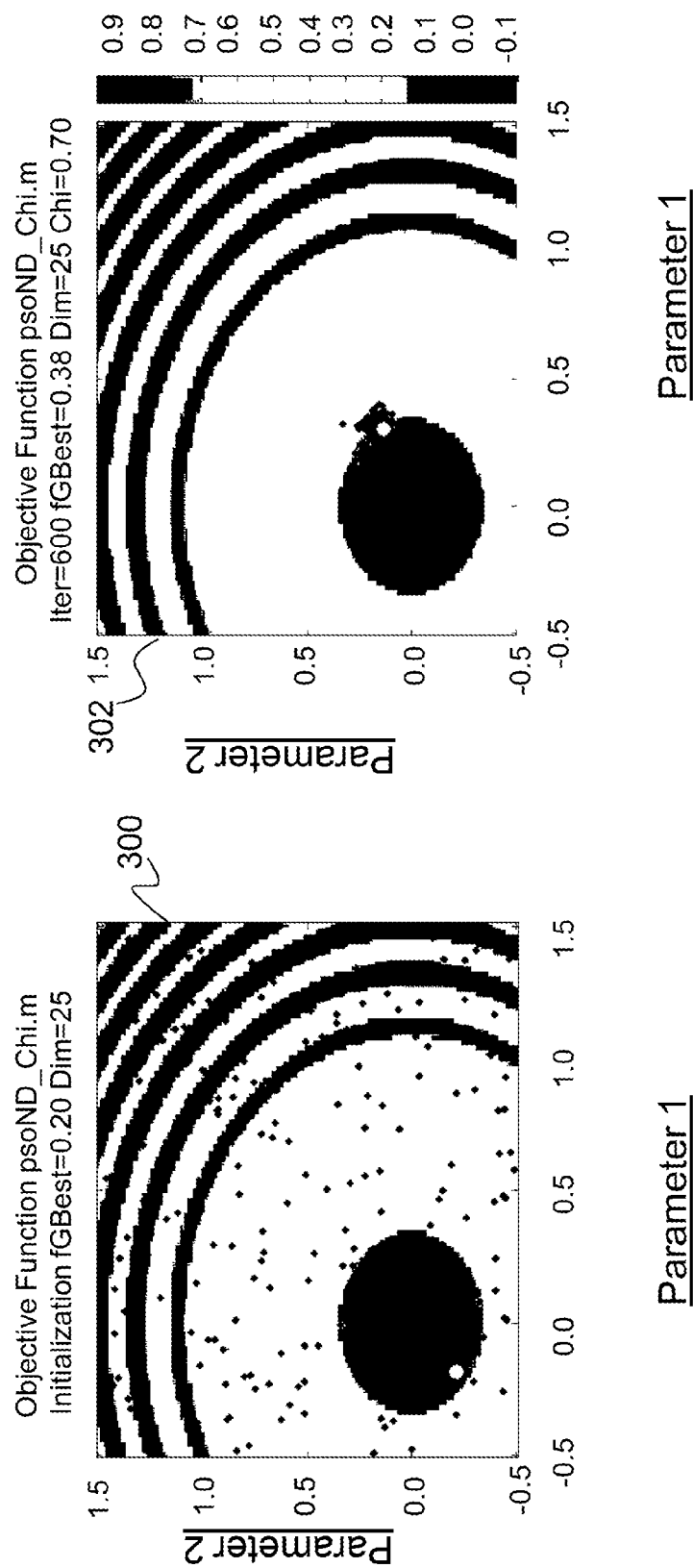
FIG. 3 illustrates simulation results of particle swarm optimization (PSO) of a 25-dimensional objective function using a 200 particle swarm according to the present invention.
Figure 4:
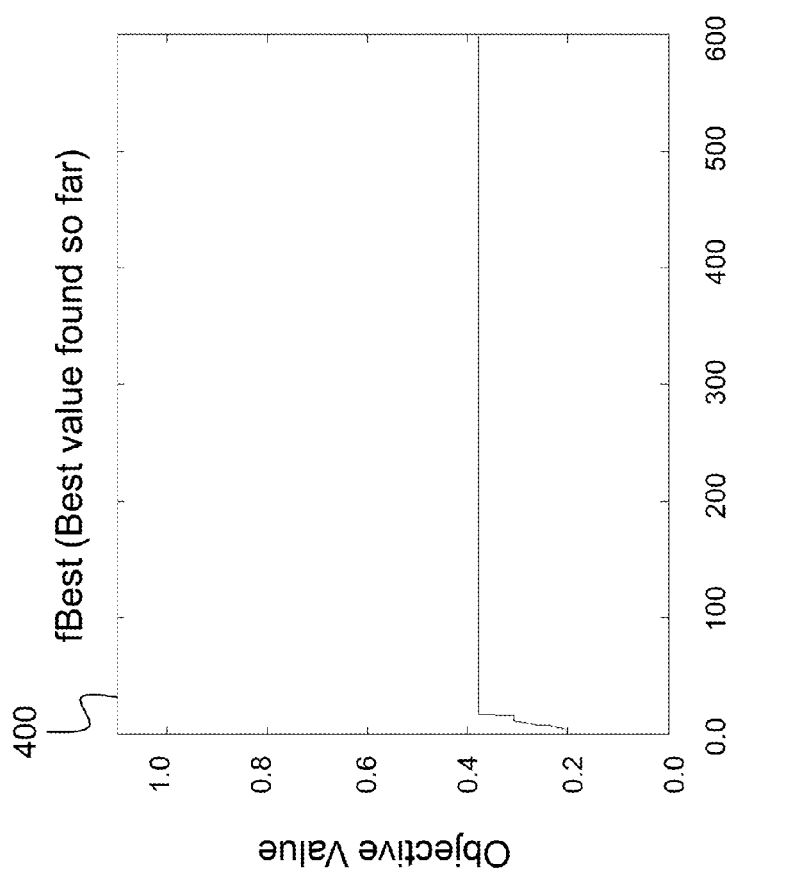
FIG. 4 is a graph of the best solution versus swarm iteration for attempted PSO optimization of a 25-dimensional objective function using a 200 particle swarm according to the present invention.

As shown in FIGS. 3 and 4, an attempted PSO optimization of 25-dimensional objective function was performed using a 200 particle swarm. Referring to FIG. 3, plots 300 and 302 are projections onto subspace consisting of first two optimization variables. The objection function is a 25-dimensional surface with multiple local optima. The optimal objective function value is 1.0 at the origin. Plot 300 represents the positions of the particles (software agents) at initialization. Plot 302 represents the positions of the particles after 600 iterations. A standard implementation of PSO using conventional fixed values of swarm parameters (X==0.7, w=0.7, $c_1$=1.4, $c_2$=1.4) with 200 particles was unable to converge on the optimum value after 600 iterations and reached a quasi-steady state, as shown in FIGS. 3 and 4.

FIG. 4 is a graph 400 illustrating the best solution versus swarm iteration for attempted PSO optimization of 25-dimensional objective function using a 200 particle swarm. The optimum value is 1.0. The optimum was not reached because of the high dimensionality and insufficient particles. SAPSO, on the other hand, was able to converge on the optimum solution after only 226 iterations by automatically adapting x using the above rule ($X_1$=0.2, $X_2$=1.5, frame length of 50, all other parameters unchanged from PSO simulation), as shown in FIGS. 5, 6A, and 6B, as described below.

Figure 5:
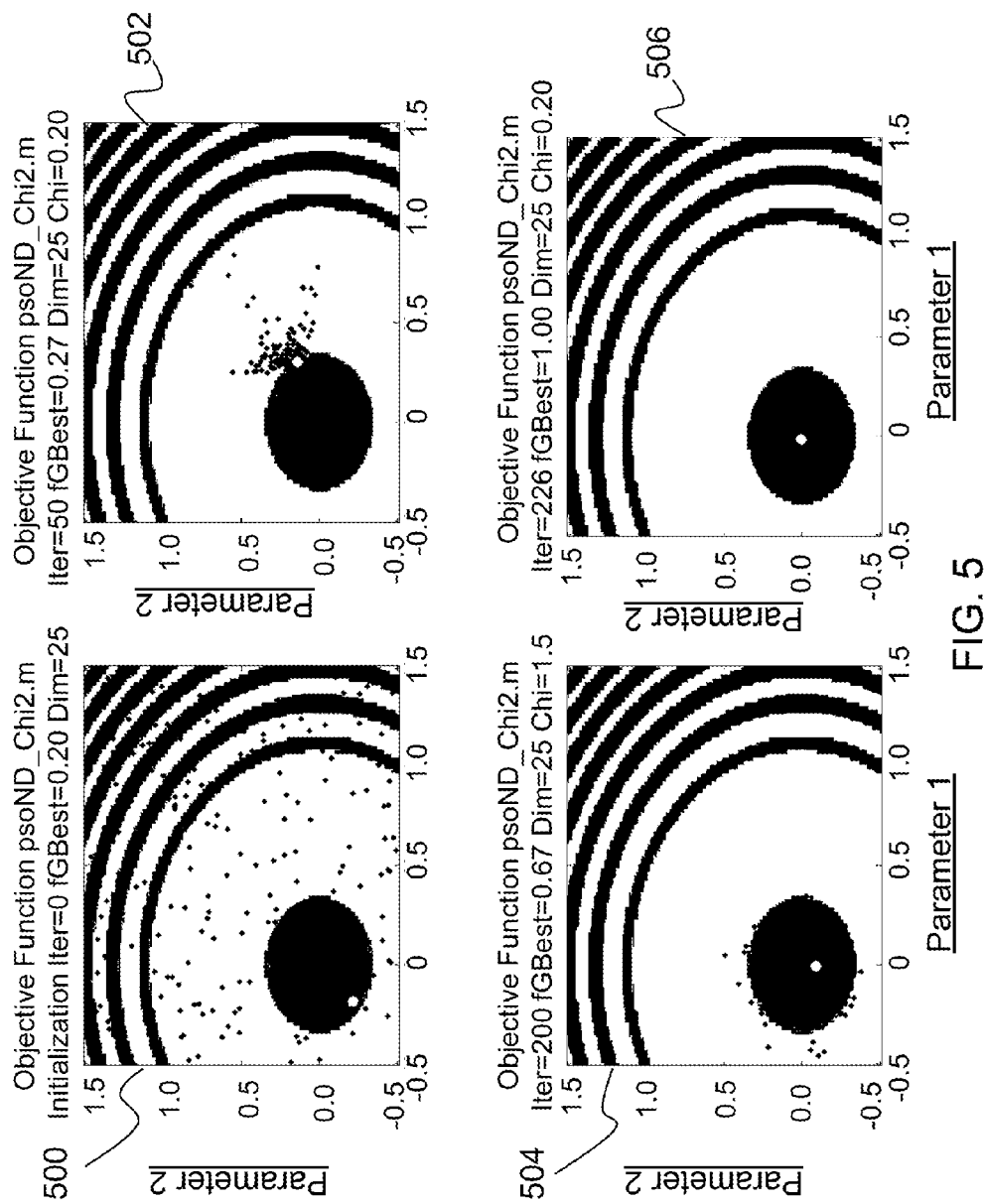
FIG. 5 illustrates simulation results of self-aware particle swarm optimization (SAPSO) of a 25-dimensional objective function using a 200 particle swarm according to the present invention.

FIG. 5 illustrates the simulation results of SAPSO optimization of 25-dimensional objective function using a 200 particle swarm. Plots 500, 502, 504, and 506 are projections onto subspace consisting of first two optimization variables. The optimal objective function value is 1.0 at the origin. Plot 500 represents the positions of the particles (software agents) at initialization. Plot 502 represents the positions of the particles after 50 iterations, plot 504 at 200 iterations, and plot 506 at 226 iterations. As shown, automatically varying x based on the swarm diameter allowed the global optimum to be reached in only 226 iterations.

Figures 6A, 6B:
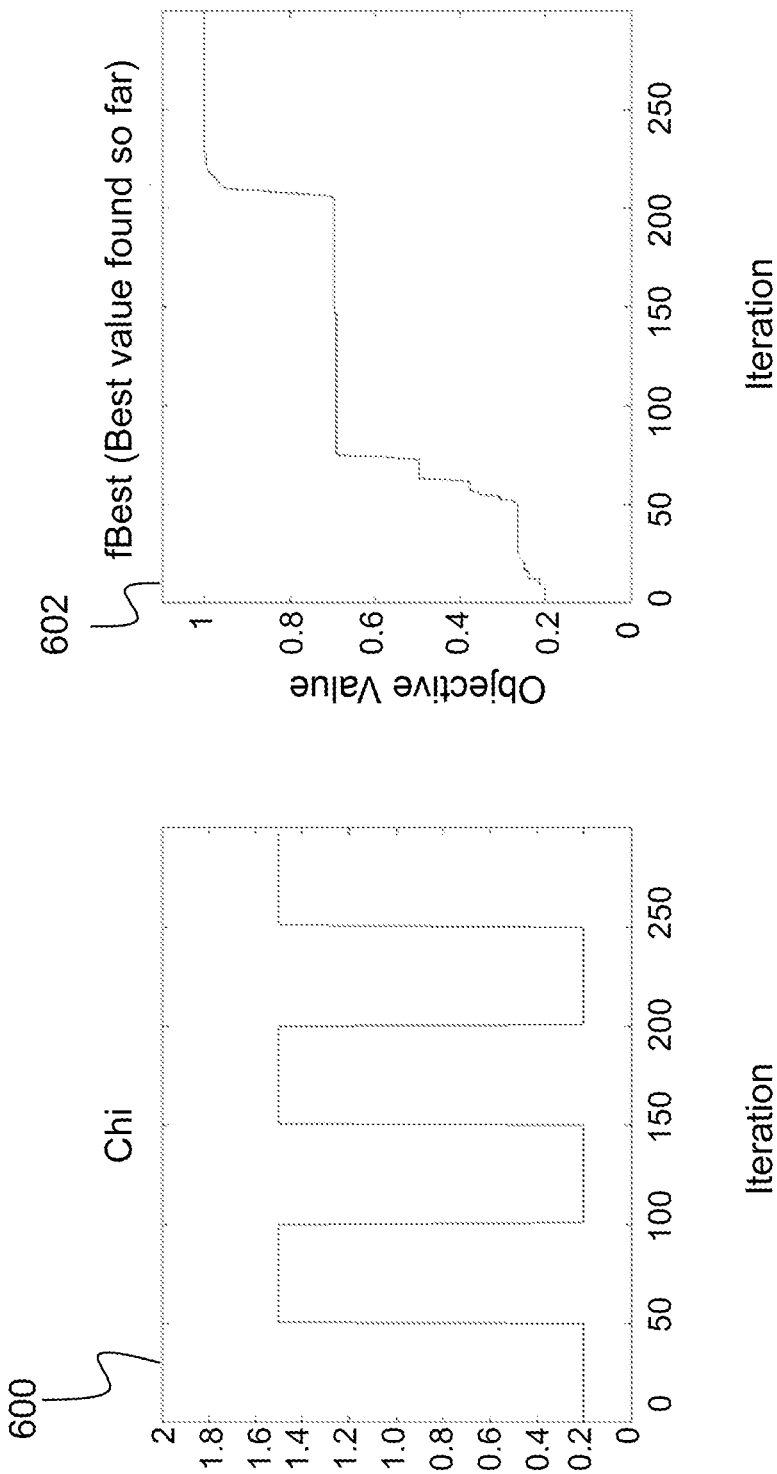
FIG. 6A illustrates a SAPSO adaptation of x according to the present invention.
FIG. 6B is a graph of the best SAPSO solution versus swarm iteration for optimization of a 25-dimensional objective function using a 200 particle swarm according to the present invention.

FIG. 6A depicts a graph 600 of a SAPSO adaptation of x based on the rule described above. FIG. 6B is a graph 602 illustrating the best SAPSO solution versus swarm iteration for optimization of 25-dimensional objective function using a 200 particle swarm. The optimum value is 1.0. The global optimum solution was reached after 226 iterations. These results demonstrate that SAPSO has superior convergence properties and can find better solutions than PSO by adapting its dynamics to the problem at runtime.

Figure 7:
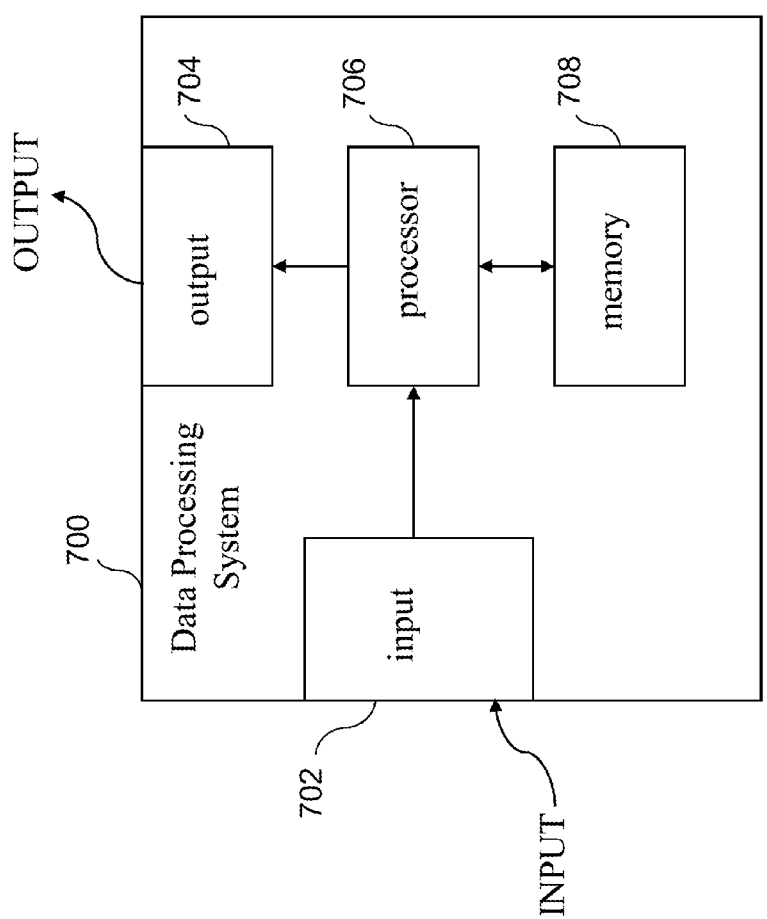
FIG. 7 is an illustration of a data processing system according to the present invention.

FIG. 7 illustrates a block diagram depicting components of a data processing system 700 (e.g., computer) incorporating the operations of the method and technique described above. The technique utilizes a data processing system 700 for storing computer executable instructions for causing a processor (or processors) to carry out the operations of the above described technique. The data processing system 700 comprises an input 702 for receiving information from a user. Information received may include input from devices such as cameras, scanners, keypads, keyboards, microphone, other peripherals such as storage devices, other programs, etc. The input 702 may include multiple "ports." An output 704 is connected with a processor 706 for providing information for transmission to other data processing systems, to storage devices, to display devices such as monitors, to generating information necessary for delivery, and to other mechanisms for presentation in user-usable forms. The input 702 and the output 704 are both coupled with the processor 706, which may be a general-purpose computer processor or a specialized processor designed specifically for use with the present invention. The processor 706 is coupled with a memory 708 to permit storage of data and software to be manipulated by commands to the processor 706.

Figure 8:
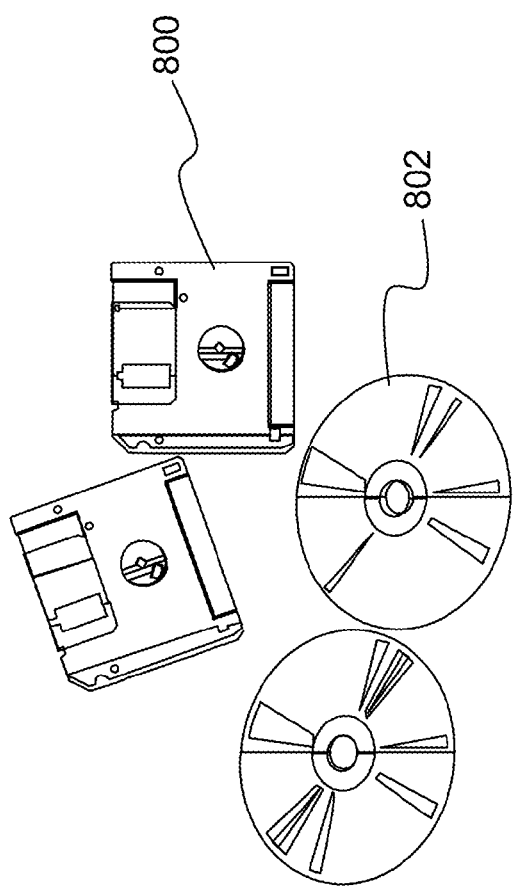
FIG. 8 is an illustration of a computer program product according to the present invention.

An illustrative diagram of a computer program product embodying the present invention is depicted in FIG. 8. As a non-limiting example, the computer program product is depicted as either a floppy disk 800 or an optical disk 802. However, as mentioned previously, the computer program product generally represents computer readable code stored on any compatible non-transitory computer readable medium.

What is claimed is:

1. A high-dimensional optimization system, the high-dimensional optimization system comprising one or more processors configured to perform operations of:

causing a plurality of software agents to operate as a cooperative swami to locate and converge at an objective function optima in a multi-dimensional solution space, wherein each software anent is assigned an initial velocity vector to explore the multi-dimensional solution space, where each software agent is configured to perform at least one iteration, the iteration being a search in the multi-dimensional solution space for a potential objective function optima where each software agent keeps track of a first position vector representing a current best solution that the software agent has identified, and a second position vector used to store a current global best solution among all software agents, with each of the initial velocity, first position, and second position vectors chancing probabilistically;

wherein the plurality of software agents is influenced by a set of parameters which influence ex flotation of the multi-dimensional solution space and convergence on the objective function optima;

wherein the plurality of software agents automatically modifies the set of parameters in response to at least one measure of convergence progress;

wherein the plurality of software agents is configured to automatically modify the set of parameters to explore a new region of the solution space if convergence is not reached on a good solution;

wherein the at least one measure of convergence progress is a standard deviation of the cooperative swarm positions, and wherein the standard deviation of the cooperative swarm positions at each iteration is used to select at least one of the set of parameters; and wherein the standard deviation of the cooperative swarm positions at each iteration is equivalent to a measure of the swarm diameter.

2. The high-dimensional optimization system as set forth in claim 1, wherein if the swarm diameter becomes less than a predetermined threshold value, at least one of the set of parameters is increased to a large value to force the cooperative swarm to explore a new region of the solution space, wherein the at least one of the set of parameters is then reduced to allow the cooperative swarm to converge on a better solution in the new region of the solution space.

3. A computer-implemented method for high-dimensional optimization, comprising an act of causing a data processor to perform operations of:

causing a plurality of software agents to operate as a cooperative swarm to locate and converge at an objective function optima in a multi-dimensional solution space, wherein each software agent is assigned an initial velocity vector to explore the multi-dimensional solution space, where each software a agent is configured to perform at least one iteration, the iteration being a search in the multi-dimensional solution space for a potential objective function optima where each software agent keeps track of a first position vector representing a current best solution that the software agent has identified, and a second position vector used to store a current global best solution among all software agents, with each of the initial velocity, first position, and second position vectors changing probabilistically;

wherein the plurality of software agents is influenced by a set of parameters which influence exploration of the multi-dimensional solution space and convergence on the objective function optima;

wherein the plurality of software agents automatically modifies the set of parameters in response to at least one measure of convergence progress;

configuring the plurality of software agents to automatically modify the set of parameters to explore a new region of the solution space if convergence is not reached on a good solution;

wherein the at least one measure of convergence progress is a standard deviation of the cooperative swarm positions, and wherein the standard deviation of the cooperative swarm position at each iteration is used to select at least one of the set of parameters; and wherein the standard deviation of the cooperative swarm positions at each iteration is equivalent to a measure of the swarm diameter.

4. The method for high-dimensional optimization as set forth in claim 3, further comprising acts of:

increasing at least one of the set of parameters to a large value to force the cooperative swarm to explore a new region of the solution space if the swarm diameter becomes less than a predetermined threshold value; and reducing the at least one of the set of parameters to allow the cooperative swarm to converge on a better solution in the new region of the solution space.

5. A computer program product for distributed network optimization, the computer program product comprising computer-readable instruction means stored on a non-transitory computer-readable medium that are executable by a computer having a processor for causing the processor to perform operations of:

causing a plurality of software agents to operate as a cooperative swarm to locate and converge at an objective function optima in a multi-dimensional solution space, wherein each software agent is assigned an initial velocity vector to explore the multi-dimensional solution space, where each software agent is configured to perform at least one iteration, the iteration being a search in the multi-dimensional solution space for a potential objective function optima where each software agent keeps track of a first position vector representing a current best solution that the software agent has identified, and a second position vector used to store a current global best solution among all software agents, with each of the initial velocity, first position, and second position vectors changing probabilistically;

where the plurality of software agents is influenced by a set of parameters which influence exploration of the multi-dimensional solution space and convergence on the objective function optima;

wherein the plurality of software agents automatically modifies the set of parameters in response to at least one measure of convergence progress, configuring the plurality of software agents to automatically modify the set of parameters to explore a new region of the solution space if convergence is not reached on a good solution;

wherein the at least one measure of convergence progress is a standard deviation of the cooperative swarm positions, and wherein the standard deviation of the cooperative swarm positions at each iteration is used to select at least one of the set of parameters; and wherein the standard deviation, of the swami positions at each iteration is equivalent to a measure of the swarm diameter.

6. The computer program product for high-dimensional optimization as set forth in claim 5, further comprising instructions mean for causing the processor to perform operations of:

increasing at least one of the set of parameters to a large value to force the cooperative swarm to explore a new region of the solution space if the swarm diameter becomes less than a predetermined threshold value; and reducing the at least one of the set of parameters to allow the cooperative swarm to converge on a better solution in the new region of the solution space.

\* \* \* \* \*